US010596967B2

(12) United States Patent
Weigert et al.

(10) Patent No.: US 10,596,967 B2
(45) Date of Patent: Mar. 24, 2020

(54) TOWING ARRANGEMENT WITH INTEGRATED IMAGING CONNECTION DEVICE

(71) Applicant: GM GLOBAL TECHNOLOGY OPERATIONS LLC, Detroit, MI (US)

(72) Inventors: Norman J. Weigert, Whitby (CA); Grant L. Meade, Whitby (CA); Ralph D. Schlottke, Oshawa (CA); Fred W. Huntzicker, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 35 days.

(21) Appl. No.: 15/936,838

(22) Filed: Mar. 27, 2018

(65) Prior Publication Data

US 2019/0299861 A1 Oct. 3, 2019

(51) Int. Cl.

| | |
|---|---|
| ***B60Q 1/30*** | (2006.01) |
| ***B60R 1/00*** | (2006.01) |
| ***B60Q 1/26*** | (2006.01) |
| ***B60D 1/36*** | (2006.01) |
| ***B60R 16/02*** | (2006.01) |

(Continued)

(52) U.S. Cl.

CPC ................ *B60R 1/003* (2013.01); *B60D 1/36* (2013.01); *B60Q 1/2603* (2013.01); *B60Q 1/2661* (2013.01); *B60Q 1/30* (2013.01); *B60R 16/0207* (2013.01); *H04N 5/2252* (2013.01); *H04N 5/2256* (2013.01); *H04N 5/2351* (2013.01); *H04N 5/2354* (2013.01); *H04N 5/23206* (2013.01); *B60R 2300/105* (2013.01); *B60R 2300/40* (2013.01); *B60R 2300/605* (2013.01);

(Continued)

(58) Field of Classification Search

CPC ....... B60R 1/003; B60R 16/0207; B60D 1/36; B60Q 1/2603; B60Q 1/2661; B60Q 1/30; H04N 5/2252; H04N 5/2256; H04N 5/23206; H04N 5/2351; H04N 5/2354

See application file for complete search history.

(56) References Cited

U.S. PATENT DOCUMENTS

2005/0183570 A1* 8/2005 McMahon ............. F41G 7/007 89/1.811

2014/0125795 A1* 5/2014 Yerke ........................ B60R 1/00 348/118

(Continued)

*Primary Examiner* — Dave Czekaj

*Assistant Examiner* — Berteau Joisil

(74) *Attorney, Agent, or Firm* — Lorenz & Kopf, LLP

(57) ABSTRACT

An imaging connection device is provided for use with a vehicle and a trailer. The vehicle includes a hitch assembly, a wired vehicle interface, and a vehicle communications unit, and the trailer includes a tow assembly and a wire harness. The imaging connection device includes a housing defining a first connector configured to mate with the wired vehicle interface and a second connector configured to mate with the wire harness; a connector interface at least partially arranged within the housing and extending between the first connector and the second connector; a camera unit at least partially arranged within the housing and configured to capture image data representing a side view of the hitch assembly; and a wireless communications unit at least partially arranged within the housing and configured to transmit the image data captured by the camera unit to the vehicle communications unit for display on a display device.

19 Claims, 8 Drawing Sheets

200 310 330 340 350 360 324 326 320 322

(51) Int. Cl.
*H04N 5/225* (2006.01)
*H04N 5/232* (2006.01)
*H04N 5/235* (2006.01)

(52) U.S. Cl.
CPC . *B60R 2300/808* (2013.01); *B60R 2300/8066* (2013.01)

(56) References Cited

U.S. PATENT DOCUMENTS

| | | | | |
|---|---|---|---|---|
| 2015/0349917 | A1* | 12/2015 | Skaaksrud | G06Q 10/0833 370/328 |
| 2016/0264052 | A1* | 9/2016 | Lynam | B60K 35/00 |

* cited by examiner

TOWING ARRANGEMENT WITH INTEGRATED IMAGING CONNECTION DEVICE

INTRODUCTION

The present invention generally relates to arrangements between towing vehicles and trailers, and more particularly relates to devices that facilitate connecting the towing vehicle and the trailer.

Some vehicles are equipped with a hitch assembly that allows for the towing of different types of objects mounted on a trailer, such as a boat, a recreation vehicle, and/or equipment. Generally, the hitch assembly is mounted to the frame of the towing vehicle proximate to the rear bumper, and includes a tow hitch ball having a certain diameter. The towed vehicle typically includes a tow assembly with a coupler that extends from a front end of the trailer into which the hitch ball is positioned during a hitching operation to secure the trailer to the vehicle.

When the trailer is detached from the towing vehicle, the trailer tow assembly is generally supported on a height adjustable stand so that the coupler is positioned higher above the ground than the hitch ball. During a hitching operation, the driver will back up the towing vehicle in order to position the hitch ball just below the coupler. Once in this position, the coupler is lowered onto the ball and secured. In certain instances, it may be difficult to accurately position the hitch ball below the coupler, for example when backing up the towing vehicle in a right or left or front or back direction to provide the exact alignment.

Accordingly, it is desirable to provide improved mechanisms for connecting a vehicle and a trailer during a hitching operation. Furthermore, other desirable features and characteristics of the present invention will become apparent from the subsequent detailed description of the invention and the appended claims, taken in conjunction with the accompanying drawings and the background of the invention.

SUMMARY

In accordance with an exemplary embodiment, an imaging connection device is provided for use with a vehicle and a trailer. The vehicle includes a hitch assembly, a wired vehicle interface, and a vehicle communications unit, and the trailer includes a tow assembly and a wire harness. The imaging connection device includes a housing defining a first connector and a second connector, the first connector configured to mate with the wired vehicle interface and the second connector configured to mate with an end of the wire harness; a connector interface at least partially arranged within the housing and extending between the first connector and the second connector; a camera unit at least partially arranged within the housing and configured to capture image data representing a side view of the hitch assembly; and a wireless communications unit at least partially arranged within the housing and configured to transmit the image data captured by the camera unit to the vehicle communications unit for display on a display device.

In accordance with a further embodiment, the camera unit and wireless communications unit are configured to receive power via the connector interface from the wired vehicle interface.

In accordance with a further embodiment, the imaging connection device includes a lighting unit coupled to the housing and configured to illuminate the side view of the hitch assembly.

In accordance with a further embodiment, the imaging connection device includes a device controller housed within the housing, coupled to the connector interface, the camera unit, and the wireless communications unit, and configured to operate the camera unit based on command signals received via the wireless communications unit.

In accordance with a further embodiment, the first connector and the second connector are seven-pin connectors.

In accordance with a further embodiment, the housing further defines a first housing part and a second housing part. The first housing part is movable relative to the second housing part, and at least a portion of the camera unit is positioned within the first housing part such that movement of the first housing part modifies an orientation of view of the camera unit.

In accordance with another embodiment, a hitching system for hitching a vehicle to a trailer includes a hitch assembly mounted to the vehicle; a tow assembly mounted to the trailer and configured to be mechanically secured to the hitch assembly during a hitching operation; a wired interface arranged on the vehicle and coupled to a power source in the vehicle; a wire harness with a first end extending from the trailer; and an imaging connection device. The imaging connection device includes a housing defining a first connector and a second connector, the first connector configured to mate with the wired vehicle interface and the second connector configured to mate with the first end of the wire harness; a connector interface at least partially arranged within the housing and extending between the first connector and the second connector such that the wired vehicle interface is electrically coupled to the wire harness; a camera unit at least partially arranged within the housing and configured to capture side view image data representing a side view of the hitch assembly; and a first communications unit at least partially arranged within the housing and configured to transmit the side view image data captured by the camera unit to a second communications unit for display on a display device.

In accordance with a further embodiment, the camera unit and the first communications unit are configured to receive power from the power source via the connector interface and the wired vehicle interface.

In accordance with a further embodiment, the first connector and the second connector are seven-pin connectors.

In accordance with a further embodiment, the second communications unit is a vehicle communications unit configured to wirelessly communicate with the first communications unit, and the hitching system further includes a vehicle control system configured to provide command signals for the imaging connection device via the vehicle communications unit and the first communications unit.

In accordance with a further embodiment, the hitching system includes a rear view camera mounted on a rear portion of the vehicle and configured to capture top view image data representing a top view of the hitch assembly and to provide the top view image data to the vehicle control system, and the vehicle control system is configured to generate display commands representing at least one of the top view image data or the side view image data on the display device.

In accordance with a further embodiment, the hitching system includes a distance sensor configured to determine a distance between the vehicle and the trailer and provide the distance to the vehicle control system, and the vehicle control system is configured to evaluate the distance and generate the display commands with the top view image data when the distance is greater than a threshold and with the side view image data when the distance is less than or equal to the threshold.

In accordance with a further embodiment, the hitching system includes a user interface coupled to the vehicle control system and having an input device configured to receive a user input from an operator. The vehicle control system selects the top view image data or the side view image data for display on the display device based on the user input.

In accordance with a further embodiment, the hitching system includes a lighting unit coupled to the housing and configured to illuminate the side view of the hitch assembly.

In accordance with a further embodiment, the vehicle control system is configured to provide the command signals to activate the lighting unit when the camera unit is active.

In accordance with a further embodiment, the hitching system includes an ambient light sensor configured to measure data representing an amount of ambient light and to provide the data representing the amount of ambient light to the vehicle control system. The vehicle control system is configured to provide the command signals to activate the lighting unit when the ambient light is less than a predetermined threshold.

In accordance with a further embodiment, the display device is a vehicle display device incorporated into an interior of the vehicle.

In accordance with another embodiment, a method is provided for hitching a vehicle having a hitch assembly and a trailer having a tow assembly in a towing arrangement. The method includes inserting an imaging connection device into a wired interface of the vehicle; powering a camera unit and a communications unit within the imaging connection device with power via the wired interface; capturing a side view image with the camera unit of a hitching environment, including the hitch assembly of the vehicle; wirelessly transmitting the side view image with the communications unit; displaying the side view image to an operator on a display device in the vehicle; and inserting, upon securing the hitch assembly to the tow assembly, a first end of a wire harness extending from the trailer into the imaging connection device such that the wire harness is electrically coupled to the wired interface.

In accordance with a further embodiment, the method includes selectively activating a lighting unit on the imaging connection device to illuminate the hitching environment.

In accordance with a further embodiment, the method includes capturing a top view image with a rear view camera mounted on the vehicle and selectively displaying the top view image.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
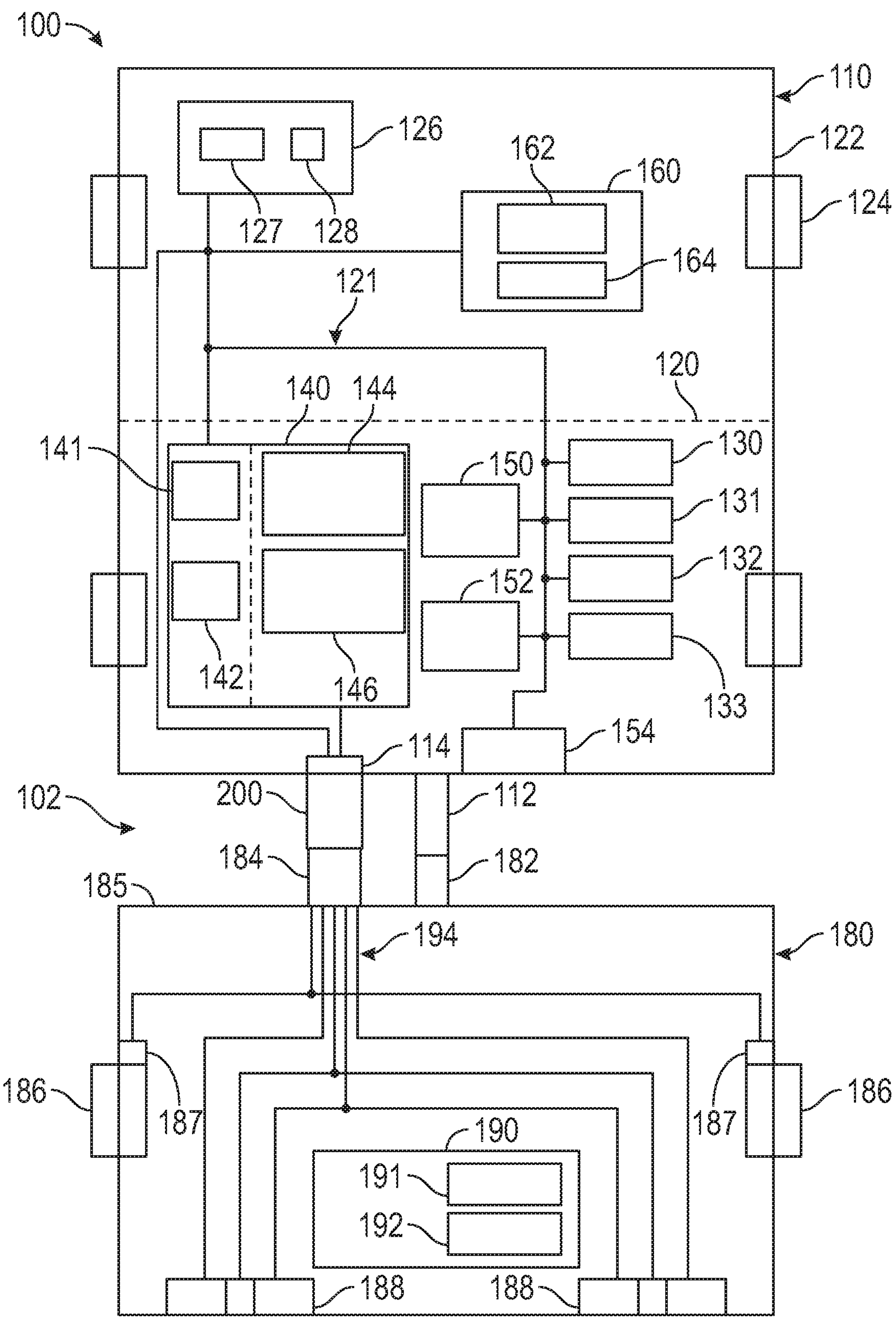
FIG. 1 is a schematic block diagram of a towing arrangement in accordance with an exemplary embodiment.

FIG. 1 is a schematic block diagram of a towing arrangement 100 that includes a vehicle 110 and a trailer 180. As discussed in greater detail below, the vehicle 110 and the trailer 180 are configured to be coupled or "hitched" together during a hitching operation. Typically, the hitching operation includes maneuvering the vehicle into a position such that a hitch assembly 112 on the vehicle 110 is positioned to mate with a tow assembly 182 on the trailer 180 to mechanically couple the assemblies 112, 182. Subsequently, an interface 114 on the vehicle 110 is coupled to a wire harness 184 extending from the trailer 180 with an integrated imaging connection device 200 to provide power and signal connections between the vehicle 110 and the trailer 180, as well as images and/or data regarding the hitch and tow assemblies 112, 182 during a hitching operation. Additional details about the interactions between the vehicle 110, the trailer 180, and the integrated imaging connection device 200 are provided below after an introduction of the other components. Generally, the integrated imaging connection device 200 and a number of other vehicle and/or trailer components discussed below may be considered a hitching system 102 that facilitates communication, connection, monitoring, and/or management of the vehicle 110 and the trailer 180 before, during, and/or after the hitching operation of the towing arrangement 100.

It will be appreciated that the vehicle 110 and trailer 180 may be implemented as any one or more of a number of different types of vehicles and trailers, respectively. For example, the vehicle 110 may be any one of a number of different types of automobiles and/or other vehicle types. For example, in various embodiments, the vehicle 110 may a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or any one of a number of other types of vehicles. Similarly, the trailer 180 may be any one of a number of different types of trailers pulled and/or transported by such a vehicle 110, including, by way of example only, trailers used to transport other automobiles, boats or other marine vehicles, other vehicles, cargo, and/or other devices and/or systems.

As shown in FIG. 1, the vehicle 110 includes a chassis 120, a body 122, a plurality of wheels 124, and a propulsion system 126. The body 122 is arranged on the chassis 120 and substantially encloses the other components of the vehicle 110. The body 122 and the chassis 120 may jointly form a frame. The wheels 124 are each rotationally coupled to the chassis 120 near a respective corner of the body 122. In various embodiments, the vehicle 110 may differ from that depicted in FIG. 1.

The propulsion system 126 is mounted on the chassis 120 and powers the vehicle 110 via movement of the wheels 124. In the depicted embodiment, the propulsion system 126 includes a propulsion device 127. In one embodiment, the propulsion device 127 is an electric motor and/or generator that is powered by a rechargeable energy storage system (RESS) (e.g., a vehicle battery) 128. In other embodiments, the propulsion device 127 is an engine, such as a combustion engine that uses gasoline, natural gas, propane, one or more biofuels, and/or one or more other types of fuel. In other embodiments, the propulsion device 127 may include one or more of these and/or other types of engines and/or motors. The propulsion device 127 is coupled to at least some of the wheels 124 through one or more drive shafts (not depicted). Generally, in addition to the storing and providing power for propulsion, the battery 128 may provide electric power to various vehicle and trailer components, including one or more aspects of the hitching system 102.

The vehicle 110 may further include any number of systems and components typically incorporated into a vehicle. As examples, the vehicle 110 may include a transmission system 130, a braking system 131, a steering system 132, and a lighting system 133. Generally, the transmission system 130 is configured to transmit power from the propulsion system 126 to the vehicle wheels 124 according to selectable speed ratios. The braking system 131 is configured to provide braking torque to the vehicle wheels 124. The steering system 132 facilitates the positioning of the vehicle wheels 124. The lighting system 133 may include one or more light generating devices, such as LEDs, to illuminate the interior and/or surrounding areas of the towing arrangement 100.

Generally, the vehicle 110 includes a control system 140 that operates to control and/or facilitate operation of various aspects of the vehicle 110, including one or more aspects of the hitching system 102, as discussed in greater detail below. In one example, one or more of the various components of the vehicle 110 may be coupled together with a bus 121 for the exchange of power and data in order to carry out the functions described herein, as also described in greater detail below. Generally, the control system 140 may include any suitable hardware and software for implementing the functions described below, including hardware and software embodied as an application specific integrated circuit (ASIC), an electronic circuit, input/output (I/O) devices, a processing unit (shared, dedicated, or group) and memory units. In FIG. 1, such components are generally represented by a processor 141 configured to execute one or more software or firmware programs in the form of instructions stored in memory 142 as any tangible, non-transitory processor-readable storage medium. The functions of the control system 140 described below may be implemented by a central component and/or as a distributed or collective group of components.

The control system 140 may be organized into a number of functional modules or units that operate collectively or independently to implement functions of the vehicle 110 and/or the overall towing arrangement 100. For example, the control system 140 may include one or more vehicle control modules 144 that generally operate to control the various aspects of the vehicle, such as the propulsion system 126, the transmission system 130, the braking system 131, the steering system 132, and lighting system 133, as examples. Additionally, the control system 140 may implement a hitching module 146 that operates to control and/or facilitate the interaction between the vehicle 110 and the trailer 180, including the hitching system 102 during the hitching operation, as discussed in greater detail below.

In various embodiments, the vehicle 110 may include one or more sensors 150 to measure and/or obtain information pertaining to one or more devices, systems, and/or components of the vehicle 110, including the control system 140. The sensors 150 may be stand-alone sensors and/or be incorporated into a larger system. As examples, in certain embodiments, the sensors 150 may include one or more input sensors for measuring user inputs as to the transmission system 130 (e.g. via position sensors), the braking system 131 (e.g. via brake pedal position, travel, and/or force sensors), the steering system 132 (e.g. via steering wheel sensors), and the lighting system 133 (e.g. light switch and/or light panel sensors), as well as various other types of data. The sensors may include, as further examples, radars, lidars, optical cameras, thermal cameras, ultrasonic sensors, and/or other sensors. In various embodiments, the sensors 150 may collect information to facilitate implementation of the hitching system 102 discussed below.

The vehicle 110 may additionally include, or otherwise interact with, a communications unit 152. Generally, the communications unit 152 includes any suitable hardware and software for facilitating communication between various components of the vehicle 110 and/or trailer 180, as well as between the vehicle 110 and remote systems, networks, and/or telematics services. As used herein, the bus 121 may be considered part of the communications unit 152. The communications unit 152 may include wired and/or wireless connection systems and protocols. As examples, communications unit 152 may include a modem and/or a transceiver that facilitate communications to, from, and throughout the vehicle 110 and trailer 180. In some embodiments, more than one form of communication may be utilized. As described in greater detail below, the communications unit 152 particularly facilitates wireless communication between the control system 140 and the imaging connection device 200, for example, to send commands and receive image data associated with the hitching operation.

As used herein, the term "wired connection" may include, for example, power line communication technology, imprinting digital, Ethernet communications, and/or other communication types. In other embodiments, the communications unit 152 communicates wirelessly, for example via a wireless network. In various embodiments, the wireless network is a long-range cellular wireless (e.g. cellular) communication network and/or a short-range wireless (e.g. WiFi, Bluetooth) communication network. In certain embodiments, the communications unit 152 may communicate with one or more wireless devices, for example a smart phone, tablet, computer, and/or other electronic device of a driver and/or other user of the vehicle 110, via one or more wireless networks (which may be the same or different as the wireless network(s) used to communicate with the vehicle 110).

The vehicle 110 may additionally include a rear view camera 154. Generally, the rear view camera 154 is mounted on a rear portion of the vehicle 110, typically on a rear tailgate, above the tailgate near the roof, or above the license plate. In some embodiments, the rear view camera 154 may be omitted. The rear view camera 154 operates to capture a plan or overhead view of the environment behind the vehicle 110, particularly a generally plan view of the hitch assembly 112 of the vehicle 110. In one embodiment, the plan view provided by the rear view camera 154 may be displayed on a display device 162 for the driver as part of the hitching system 102.

The rear view camera 154 may include any type of camera capable of capturing image data, video data, or an image data stream (generally, referenced below as "image" or "images"), as known to those skilled in the art. In certain embodiments, the rear view camera 154 may include a color camera capable of capturing color images; an infrared camera to capture infrared images; and/or a grayscale camera to capture grayscale images. Images may be captured by the rear view camera 154 according to various timings or other considerations. In certain embodiments, for example, the rear view camera 154 may capture images continuously as the vehicle 110 moves, manually based on driver activation, or based on a gear range of the transmission system 130.

The rear view camera 154 may be coupled to the control system 140 and/or a user interface 160 with a wired connection, e.g., via the bus 121, that facilitates the transfer of data, power, commands, etc. In other examples, the rear view camera 154 may be coupled with a wireless connection, e.g., via the communications unit 152.

The vehicle 110 further includes a user interface 160 with a display device 162 and an input device 164, which may be collocated with one another or separated. In one example, the user interface 160 is in the form of a dedicated system or arrangement, such as an information system for the vehicle 110. In some embodiments, the user interface 160 may be incorporated into other vehicle components, such as a rear view mirror. In further embodiments, the user interface 160 may be incorporated and/or implemented into a mobile user device, such as a mobile phone or tablet.

In one example, the display device 162 is implemented as a flat panel display in an instrument panel or console of the vehicle 110. The display device 162 is an electronic display capable of graphically displaying one or more images, graphics, or interfaces under the control of the control system 140. The display device 162 comprises any suitable technology for displaying information, including, but not limited to, a liquid crystal display (LCD), organic light emitting diode (OLED), plasma, or a cathode ray tube (CRT).

The input device 164 is configured to receive inputs from the driver and/or occupant of the vehicle 110. The input device 164 may be implemented as a keyboard, a microphone associated with a speech recognition system, a touchscreen layer associated with the display device 162, switches or levers, one or more buttons, a driver monitoring system (DMS) or other suitable device to receive data and/or commands from the user. Multiple input devices may also be utilized. The display device 162 and the input device 164 are in communication with the control system 140 over a suitable communication architecture or arrangement that facilitates transfer of data, commands, power, etc. As described below, the user interface 160 may be utilized in the implementation of the hitching system 102.

As introduced above, the hitch assembly 112 and vehicle interface 114 are mounted on the vehicle 110 to facilitate coupling the vehicle 110 and trailer 180. The hitch assembly 112 and vehicle interface 114 are described in greater detail below within the context of the other components of the hitching system 102 after an introduction of the trailer components.

Generally, the trailer 180 includes a frame or chassis 185 on wheels 186 to be towed by the vehicle 110. It should be appreciated that the trailer components shown in FIG. 1 are only for purposes of illustration, and the actual arrangement or configuration of components, devices, modules and/or systems may vary substantially from that shown here and not limited to any particular embodiment.

As introduced above, the tow assembly 182 provides for the primary mechanical coupling between the trailer 180 and the vehicle 110, and the wire harness 184 provides for an electrical coupling of one or more of the components of the trailer 180 to one or more cooperating components of the vehicle 110, particularly for the transfer of power and/or data. The wire harness 184 extends from the front of the trailer 180 and is configured to be connected to the interface 114 of the vehicle 110 with the integrated imaging connection device 200. Additional details about the tow assembly 182, wire harness 184, and integrated imaging connection device 200 are provided below.

In some embodiments, the trailer 180 may also be provided with a braking assembly 187 to facilitate stopping of the trailer 180. As shown in the embodiment in FIG. 1, braking assembly 187 includes two braking devices, a left brake and a right brake; however, there may be one or more braking devices. A lighting assembly 188 may be provided having lights with various functions and positions on the trailer 180. As examples, the lighting assembly 188 may include right and left turn lights, tail lights, and backup lights. Each light of the lighting assembly 188 may include at least one light-emitting component, such as an LED or incandescent light bulb.

In some embodiments, the trailer 180 may include a controller 190 to facilitate and/or control one or more functions associated with operation of the trailer 180. As above, the controller 190 may be implemented with a processing device and a memory device, and the controller 190 may include any variety of electronic processing devices, memory devices, input/output (I/O) devices, and/or other known components, and may perform various processing, control and/or communication related functions. According to one embodiment, controller 190 is configured to provide support for the various components of the trailer 180, including the braking assembly 187 and lighting assembly 188. In one embodiment, the controller 190 may have a wired connection with the components of the trailer 180 and/or the vehicle 110. In other embodiments, the controller 190 may utilize a wireless communications unit 191 that may communicate with the control system 140 and/or integrated imaging connection device 200. The communications unit 191 may have similar characteristics to the communications unit 152 discussed above, or it may have different arrangements. Further, the controller 190 may include or otherwise receive data from one or more sensors 192. Any type of sensor 192 configured to collect desired information associated with the trailer or trailer environment may be provided. In some embodiments, one more of the trailer controller 190, communications unit 191, and/or sensors 192 may be omitted.

As introduced above and described in greater detail below, the wire harness 184 provides the primary electrical and data coupling between the trailer 180 and the vehicle 110. In one embodiment, the wire harness 184 may be incorporated into and/or include a wired connection arrangement 194 extending to one or more trailer components. In this manner, data signals and/or power may be provided from (and/or to) the vehicle 110 to (and/or from) the controller 190, communications unit 191, sensors 192, braking assembly 187, and lighting assembly 188. In particular, the vehicle control system 140 may provide control signals and the battery 128 may provide power to the trailer components via the vehicle interface 114 and wire harness 184, as well as the imaging connection device 200, as described below.

Figure 2:
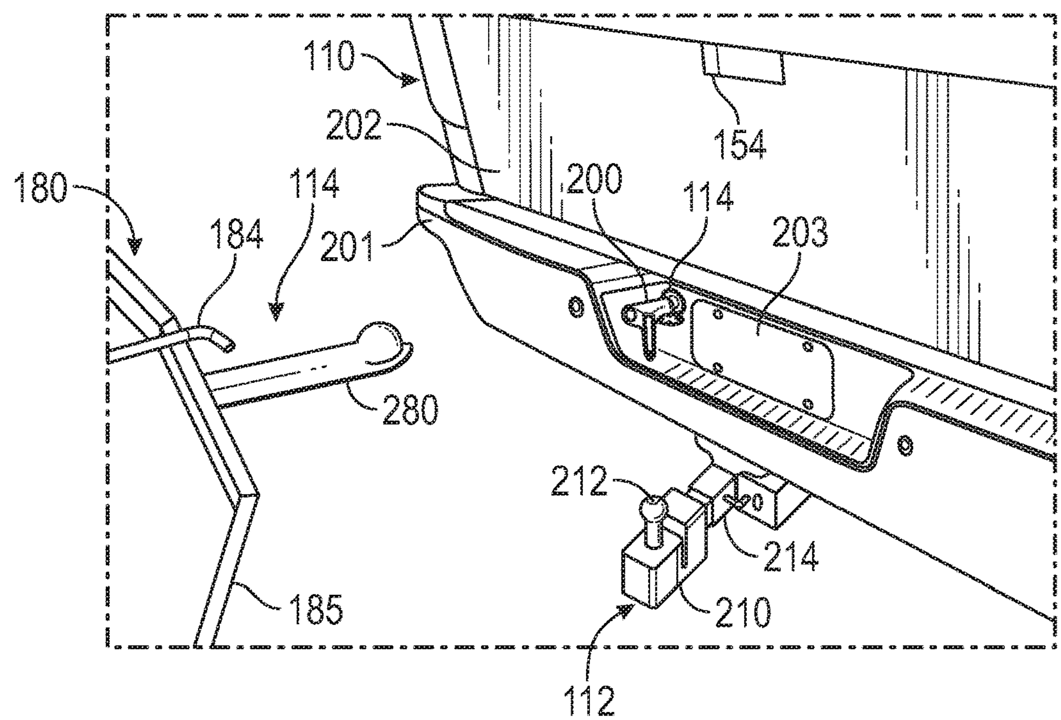
FIG. 2 is an isometric top view of the environment of the towing arrangement of FIG. 1 prior to a hitching operation in accordance with an exemplary embodiment.

FIG. 2 is a perspective view of the back end of the vehicle 110 and the front end of the trailer 180 in accordance with one exemplary embodiment. The view of FIG. 2 corresponds to an example scenario of the hitching environment prior to a hitching operation in which the trailer 180 is to be connected to the vehicle 110 in the towing arrangement 100. As an example vehicle configuration, the view of FIG. 2 includes a rear bumper 201, a tailgate 202, and license plate mount 203. With reference to FIG. 1, the view of FIG. 2 further includes an exemplary arrangement of the hitch assembly 112, vehicle interface 114, rear view camera 154, tow assembly 182, wire harness 184, and imaging connection device 200.

On the vehicle 110, the hitch assembly 112 is mounted to the vehicle chassis 120 and extends from the rear of the vehicle 110. As shown, the hitch assembly 112 may include a receiver hitch 214 that receives a ball mount 210 supporting an upwardly extending trailer ball 212. On the trailer 180, the tow assembly 182 includes a trailer coupler 280 extending from the trailer frame 185. Other configurations and arrangements for the hitch assembly 112 and/or tow assembly 182 may be provided, such as pintle hooks, gooseneck hitches, fifth wheel hitches, and the like.

Prior to the hitching operation or as the initial step of the hitching operation, the imaging connection device 200 is inserted into the vehicle interface 114. During the hitching operation, the driver maneuvers the vehicle 110 such that the trailer ball 212 is underneath the end of the trailer coupler 280. The trailer coupler 280 is then lowered onto the trailer ball 212. The trailer coupler 280 is configured to receive and capture the trailer ball 212 such that the trailer 180 is secured to the vehicle 110. Additional hardware, such as safety chains, may be provided. Upon securement of the trailer ball 212 within the trailer coupler 280, the end of the wire harness 184 is inserted into the imaging connection device 200 such that data and power may be transferred with a wired connection between the vehicle 110 and the trailer 180 via the vehicle interface 114, imaging connection device 200, and wire harness 184. Additional details about the hitching operation are provided below.

As shown, the vehicle interface 114 is typically arranged on the bumper to one side of the license plate mount 203. In other embodiments, the vehicle interface 114 may be located in other positions, such as below the bumper or above the bumper. For example, the vehicle interface 114 may be positioned on the frame of the vehicle 110 below the bumper.

The vehicle interface 114, imaging connection device 200, and wire harness 184 are configured to have complimentary connection interfaces. In one embodiment, the vehicle interface 114, imaging connection device 200, and wire harness 184 are standard 7-pin SAE 560 compliant interfaces; however, it should be appreciated that vehicle-trailer interfaces may be implemented as any type of electrical and/or mechanical connection. For example, the vehicle interface 114, imaging connection device 200, and wire harness 184 may be implemented with 4-pin interfaces.

In one example, the vehicle interface 114 is formed with pins arranged in a female (or socket) connector. The wire harness 184 is formed with pins arranged in a male (or plug) connector. The imaging connection device 200 is formed with both configurations, e.g., pins arranged in a female-side connector and pins arranged in a male-side connector. In this manner, the male-side connector of the imaging connection device 200 may be inserted into the vehicle interface 114, and the wire harness 184 may be inserted into the female-side connector of the imaging connection device 200, thereby securing a wired connection between the vehicle 110 and the trailer 180.

As noted above, the pins forming the vehicle interface 114, imaging connection device 200, and wire harness 184 may be arranged in a standard 7-pin SAE 560 compliant format in which the pins may have a designated function within the towing arrangement 100 for transferring power, commands, and/or data between the vehicle 110 and trailer 180. For example, the pins may include the following functions: a first pin assigned to ground; a second pin assigned to provide power, commands, and/or data to the trailer braking assembly 187; a third pin assigned to provide power, commands, and/or data to the tail or running lights of the lighting assembly 188; a fourth pin assigned to provide auxiliary power or charging; a fifth pin assigned to provide power, commands, and/or data to the left turn or stopping lights of the lighting assembly 188; a sixth pin assigned to provide power, commands, and/or data to the right turn or stopping lights of the lighting assembly 188; and a seventh pin assigned to provide power, commands, and/or data to the backup lights of the lighting assembly 188. In this manner, the control system 140 of the vehicle 110 may provide power, commands, and/or data to one or more components of the trailer 180 with a wired connection. Such connections may be direct or through the trailer controller 190. Additionally, and as discussed in greater detail below, the imaging connection device 200 may also use power from the interface 114, particularly at least a portion of the power assigned to the fourth pin, while enabling the wired connection to maintain all functionality with respect to the trailer 180.

Figure 3:
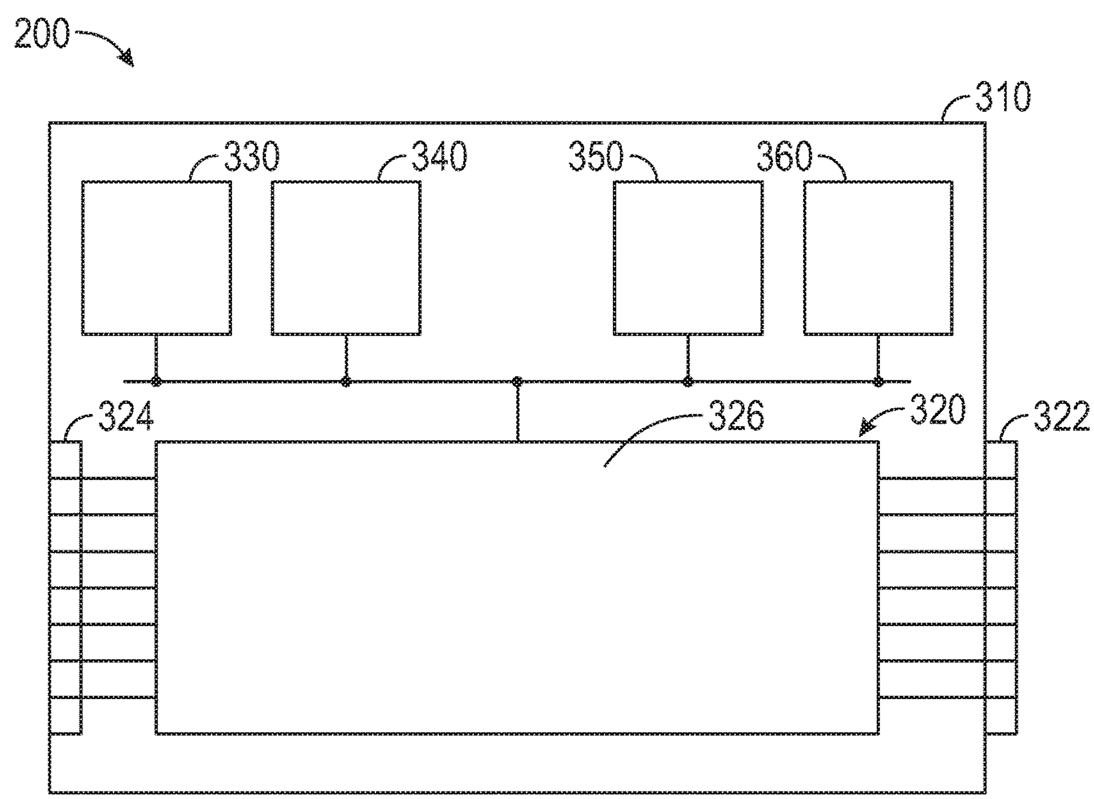
FIG. 3 is a schematic block diagram of an integrated imaging connection device of the towing arrangement of FIG. 1 in accordance with an exemplary embodiment.

FIG. 3 is a schematic block diagram of the integrated imaging connection device 200 of the towing arrangement 100 of FIG. 1 in accordance with an exemplary embodiment. In one exemplary embodiment, the components of the imaging connection device 200 are arranged within a housing 310. Within the housing 310, the imaging connection device 200 may include a wired assembly 320, a device controller 330, a communications unit 340, a camera unit 350, and a lighting unit 360.

The wired assembly 320 is formed by a male-side connector 322, a female-side connector 324, and a connector interface 326. The male-side connector 322 and female-side connector 324 were introduced above with reference to FIG. 2 in which the male-side connector 322 is configured to be inserted into the vehicle interface 114 and the female-side connector 324 is configured to receive the end of the wire harness 184. As examples, the male-side connector 322 may have a cylindrical housing portion in which the pins are outwardly arranged to appropriately contact corresponding pins of a cooperating female-side connector with detents and/or selectable locking mechanisms that enable secure attachment and detachment. Conversely, the female-side connector 324 may have a cylindrical housing portion in which the pins are inwardly arranged to appropriately contact corresponding pins of a cooperating male-side connector with detents and/or selectable locking mechanisms that enable secure attachment and detachment.

The connector interface 326 functions to connect the male-side connector 322 and the female-side connector 324 within the housing 310. The connector interface 326 is also configured to provide power, data, and/or commands to and/or from one or both of the vehicle 110 and/or trailer 180 from the power, data, and/or commands transferred through the vehicle interface 114 and/or wire harness 184. In particular, in one embodiment, the connector interface 326 provides power (e.g., through the fourth pin) that is supplied by the battery 128 on the vehicle 110 and intended for use by one or more trailer components. In this manner, the vehicle battery 128 may be used to power the components of the imaging connection device 200, such as the device controller 330, communications unit 340, camera unit 350, and/or lighting unit 360, thereby enabling the imaging connection device 200 to operate without an internal battery. Typically, the connector interface 326 only utilizes a portion of the power flowing through the wired assembly 320 to the imaging connection device 200 such that operation of the trailer components is not otherwise impacted.

The device controller 330 facilitates and/or controls one or more functions associated with operation of the imaging connection device 200. As above, the device controller 330 may be implemented with a processing device and a memory device, and the device controller 330 may include any variety of electronic processing devices, memory devices, input/output (I/O) devices, and/or other known components, and may perform various processing, control and/or communication related functions. According to one embodiment, device controller 330 is configured to provide command signals to the communications unit 340, camera unit 350, and lighting unit 360. In particular, the device controller 330 may receive commands from the hitching module 146 of the vehicle control system 140; provide activation signals and deactivation signals to the camera unit 350 and lighting unit 360; receive image data from the camera unit 350; and facilitate sending the image data to the vehicle control system 140 via the device communications unit 340.

The communications unit 340 is configured to send and/or receive information to and/or from the vehicle control system 140 and other vehicle or trailer components. In one embodiment, the communications unit 340 communicates wirelessly with the vehicle control system 140 via the vehicle communications unit 152. For example, the communications unit 340 may receive command signals for the device controller 330, and the communications unit 340 may send image data from the camera unit 350 to the vehicle control system 140. The communications unit 340 may include a transceiver to communicate with the vehicle control system 140 and/or user interface 160 according to any suitable wireless standard (e.g., via short range wireless network, such as WiFi, Bluetooth).

The camera unit 350 may include any suitable device for capturing image data or an image data stream, as known to those skilled in the art. In certain embodiments, the camera unit 350 may include a color camera capable of capturing color images; an infrared camera to capture infrared images; and/or a grayscale camera to capture grayscale images. The camera unit 350 may be activated by the device controller 330 (and/or vehicle control system 140) and provide the image data to the device controller 330 for transfer to the vehicle control system 140. As described in greater detail below, the vehicle control system 140 may render images associated with the image data to the operator via the vehicle display device 162.

The lighting unit 360 may include at least one light-emitting component, such as an LED or incandescent light bulb. The lighting unit 360 may be activated by the device controller 330 and (and/or vehicle control system 140) facilitate the capturing of the image data by the camera unit 350. Additional details about operation of the imaging connection device 200 are provided below.

Figure 4:
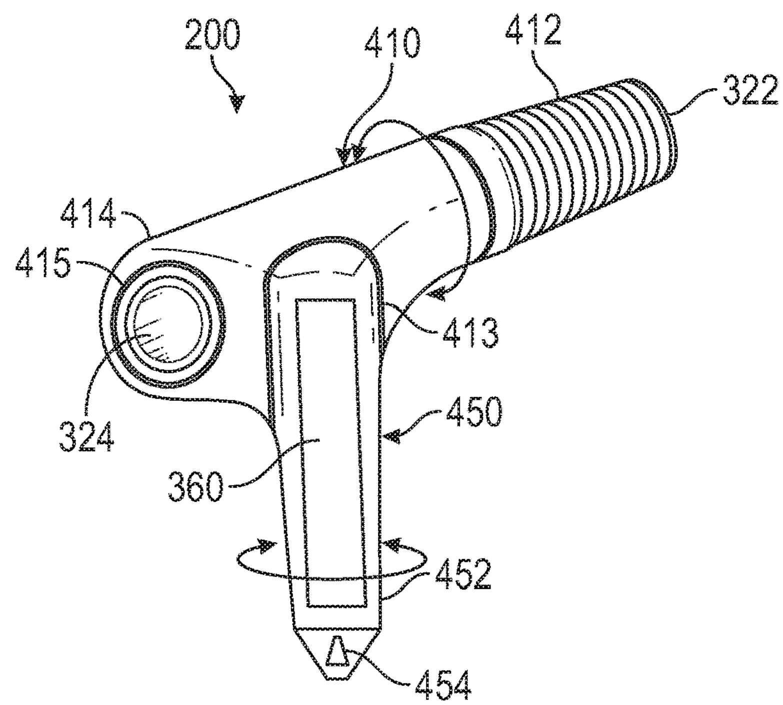
FIG. 4 is an isometric view of the integrated imaging connection device of FIG. 3 in accordance with an exemplary embodiment.

FIG. 4 is a side view of the integrated imaging connection device 200 of FIG. 3 in accordance with an exemplary embodiment. In FIG. 4, the imaging connection device 200 has been removed from the towing arrangement 100 of FIG. 1. FIG. 4 particularly depicts the outer housing 310 and overall shape and form of the imaging connection device 200. Other shapes and formats may be provided.

In this embodiment, the imaging connection device 200 is configured with a first portion 410 and a second portion 450. The first portion 410 has a generally cylindrical shape between a first end 412 and a second end 414. The first end 412 may be at least partially formed by the male-side connector 322 introduced above, and the second end 414 may be at least partially by the female-side connector 324 introduced above. The second end 414 may be enlarged relative to the first end 412 and support the second portion 450. The second portion 450 extends from the first portion 410 to a distal end 452. Relative to an installed orientation, the first portion 410 may be arranged horizontally and the second portion 450 may be arranged vertically, although other embodiments may have other configurations.

The lighting unit 360 discussed above may be supported on the second portion 450. In one embodiment, the lighting unit 360 may be positioned inside the housing 310 with an aperture within the second portion 450 that enables the generated light to illuminate the surrounding area, and in other embodiments, the lighting unit 360 may be mounted on an exterior of the second portion 450 with connections to the device controller 330 for powering and activating the light generating units of the lighting unit 360.

The distal end 452 of the second portion 450 may be formed with an aperture or lens 454 of the camera unit 350. As such, the distal end 452 positions the camera unit 350 to capture the desired image data. As described in greater detail below, the camera unit 350 of the imaging connection device 200 is configured to capture a side or lateral view of hitch assembly 112 and tow assembly 182. Since the camera unit 350 of the imaging connection device 200 is mounted to the vehicle 110 at the fixed position of the vehicle interface 114, the image may be provided at a consistent known perspective or vehicle coordinate system associated with the vehicle 110. Stated another way, the location of the camera unit 350 is fixed to the vehicle 110 such that the location (position and pose) is consistent for ready evaluation and consideration by the operator.

As noted above, the imaging connection device 200 is positioned and oriented to capture a side or lateral view of the hitch assembly 112 and tow assembly 182. Generally, a side or lateral view is considered a view approximately orthogonal to the generally overhead view captured by the rear view camera 154. In one embodiment, a side view captured by the imaging connection device 200 may be considered a view of less than 45°, e.g., the lens of the camera unit 350 forms a line with the hitch ball 212 that is less than 45° relative to horizontal.

As also shown in FIG. 4, portions of the imaging connection device 200 may be adjustable. This enables the imaging connection device 200 to be used across vehicle platforms with different vehicle interface and/or hitch assembly positions.

In one embodiment, a segment of the first portion 410 may be configured as a sleeve or split housing part relative to the first end 412 such that the segment of the first portion 410 rotates relative to the first end 412 and relative to the connectors 322, 324. As used herein, the term "rotation" includes partial rotation or pivoting. As one example, FIG. 4 depicts a joint or interface 415 of the first portion 410 relative to the female-side connector 324, thereby enabling rotation of the first portion 410 (and the second portion 450) about the longitudinal axis of the first portion 410. The joint 415, and any cooperating joints or interfaces, may be formed in any suitable manner that enables rotation while axially and radially retaining the components relative to the longitudinal axis of the first portion 410. Since the camera unit 350, particularly the lens 454, is housed within the second housing part 450, rotation of the first portion 410 enables the orientation of the resulting view to be modified.

Additionally, in this embodiment, the second portion 450 may be configured with a joint or interface 413 that enables rotation or pivoting of the second portion 450 about a longitudinal axis of the second portion 450 (which is orthogonal of the longitudinal axis of the first portion 410). As above, the joint 415 may be formed in any suitable manner that enables rotation or pivoting while otherwise retaining the components. Since the camera unit 350, particularly the lens 454, is housed within the second housing part 450, the rotation of the second portion 450 further enables the orientation of the resulting view to be modified in a manner orthogonal to the modified orientation enabled by the adjustment of the first portion 410 discussed above.

Any suitable connection features and/or electric couplings may be provided to facilitate rotation. Typically, the adjustment of the imaging connection device 200 may be performed manually, while in other embodiments, the imaging connection device 200 may include an actuator that receives signals from the vehicle controller based on operator commands to automatically adjust the orientation of view.

Figure 5:
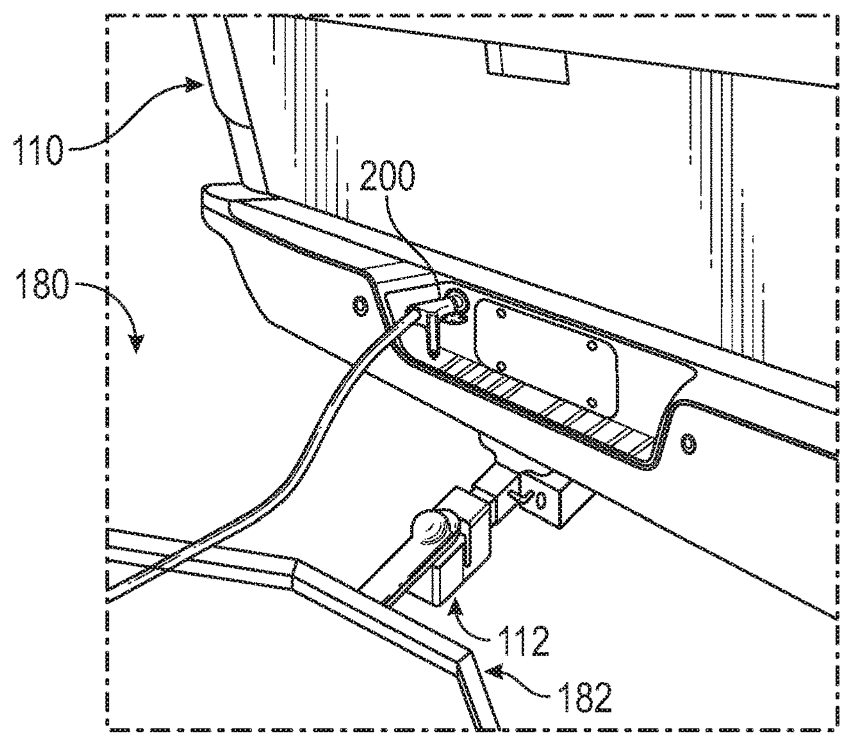
FIG. 5 is an isometric top view of the environment of the towing arrangement of FIG. 1 after the hitching operation in accordance with an exemplary embodiment.

FIG. 5 is an isometric top view of the environment of the towing arrangement 100 of FIG. 1 after the hitching operation in accordance with an exemplary embodiment. In particular, the view of FIG. 5 corresponds to the view of FIG. 2 after maneuvering the hitch assembly 112 of the vehicle 110 into position for connection with the tow assembly 182 of the trailer 180. Upon securement, the end of the wire harness 184 is inserted into the imaging connection device 200 in order to provide the wired connection between the components of the vehicle 110 and trailer 180. The imaging connection device 200 facilitates the hitching operation by providing images of the environment that enable more efficient and accurate maneuvering of the vehicle 110 relative to the trailer 180 such that the respective assemblies 112, 182 are appropriately positioned for connection. In particular, the hitching system 102 uses the imaging connection device 200 to generate images of the hitching environment for display to the driver, such as on the display device 162. The generation and display of the images may be based on a number of parameters, examples of which are described below.

Figure 6:
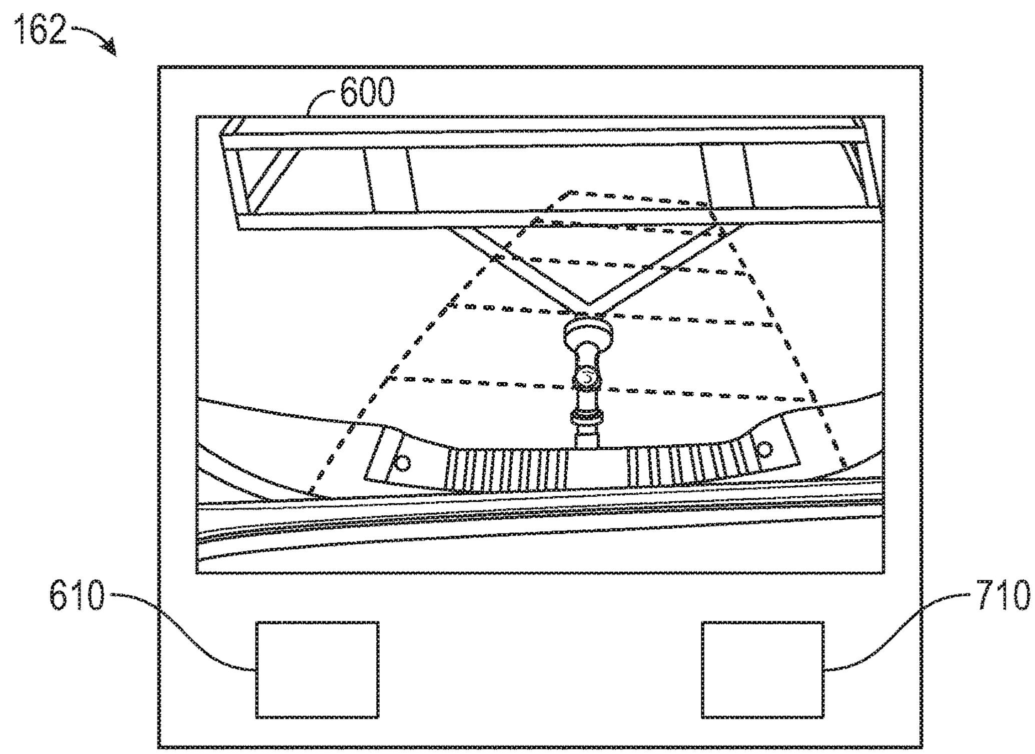
FIG. 6 is a representation of a display device depicting a first image of the hitching environment in accordance with an exemplary embodiment.
Figure 7:
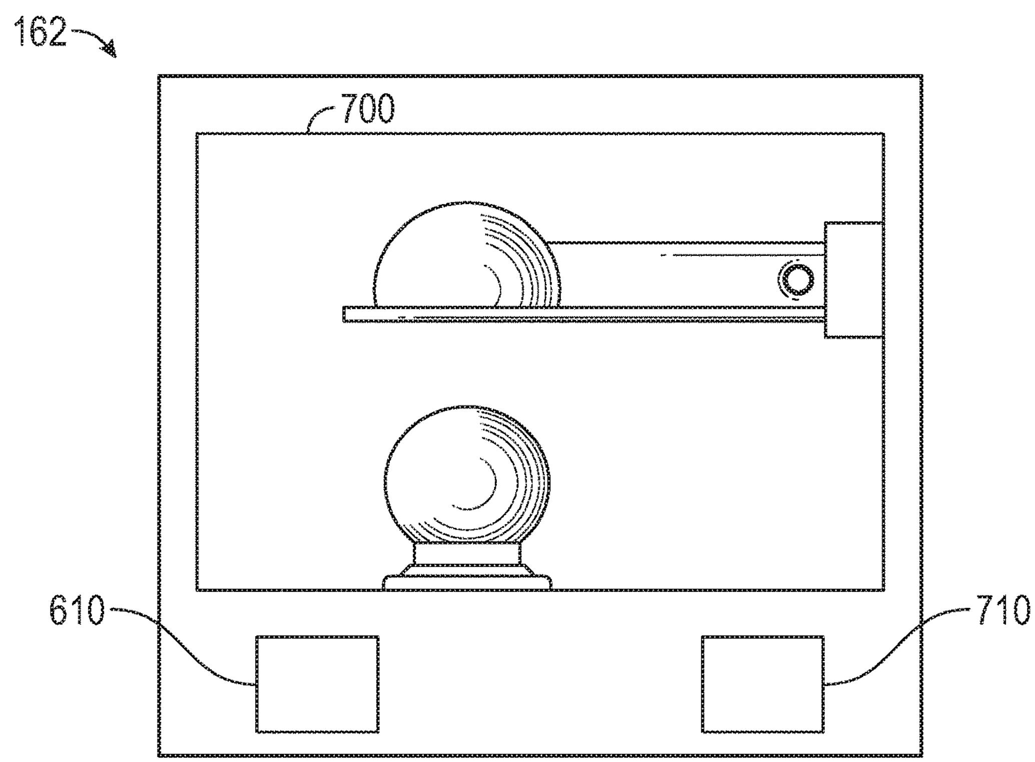
FIG. 7 is a representation of a display device depicting a second image of the hitching environment in accordance with an exemplary embodiment.

FIGS. 6 and 7 are representations of the display device 162 depicting example images 600, 700 of the hitching environment. In each of the images 600, 700 of FIGS. 6 and 7, the hitching environment includes a view of the hitch assembly 112 on the rear of the vehicle 110 and the tow assembly 182 on the front of the trailer 180. Each view may be beneficial to the driver, depending on the parameters defining the situation.

As a first example, FIG. 6 is a representation of the display device 162 with an example image 600 in the form of an overhead or top view. The overhead view image 600 of FIG. 6 is generated based on image data collected by the rear view camera 154. As shown, due to the position and orientation of the rear view camera 154, the overhead view image 600 provides an indication of the longitudinal alignment of the hitch and tow assemblies 112, 182, e.g., to make sure that the vehicle 110 and trailer 180 are on a common longitudinal axis, in the left or right directions. This is generally beneficial during the initial stages of the hitching operation when the vehicle 110 is still at a certain distance from the trailer 180.

As a second example, FIG. 7 is a representation of the display device 162 with an example image 700 in the form of a side or lateral view. The lateral view image 700 of FIG. 7 is generated based on image data collected by the camera unit 350 of the imaging connection device 200. As shown, due to the position and orientation of the camera unit 350, the lateral view image 700 provides an indication of the lateral alignment of the trailer ball 212 of the hitch assembly 112 with the trailer coupler 280 of the tow assembly 182, e.g., to make sure that the vehicle 110 and trailer 180 are in proper positions along the common longitudinal axis, in a forward or reverse direction. This is generally beneficial during the final stages of the hitching operation when the driver is attempting to place the trailer ball 212 underneath the trailer coupler 280.

Referring to both FIGS. 6 and 7, in one embodiment, the driver may select the desired image 600, 700 for display on the display device 162. The driver may use the input device 164 in the form of interactive display elements 610, 710. In this example, selection of display element 610 results in the display of image 600, as shown in FIG. 6, and selection of display element 710 results in the display of image 700, as shown in FIG. 7. In this manner, a driver may toggle between the images 600, 700 as necessary or desired during the hitching operation.

In further embodiments, the display of the images 600, 700 may be at least partially automated or otherwise dependent on the distance between the vehicle 110 and trailer 180. For example, a distance sensor (e.g., one of the sensors 150 of FIG. 1) may collect distance measurement data between the vehicle 110 and trailer 180 and provide such data to the vehicle control system 140. The hitching module 146 of the vehicle control system 140 may evaluate the distance measurement data, for example, by comparing the distance measurement data to a distance threshold stored in memory 142. When the distance is greater than the distance threshold, the hitching module 146 may provide display commands to the display device 162 representing image data from the rear view camera 154, thereby resulting in the image 600 of FIG. 6. However, when the distance is less than or equal to the distance threshold, the hitching module 146 may provide display commands to the display device 162 representing image data from the camera unit 350 of the imaging connection device 200, thereby resulting in the image 700 of FIG. 7. In this manner, the images 600, 700 may be automatically switched on the display device 162 when the vehicle 110 approaches the trailer 180. In some embodiments, the display device 162 may be configured to provide both images 600, 700 at the same time, e.g., as a split screen or picture-in-picture arrangement.

In addition to the images 600, 700 provided on the display device 162, the hitching system 102 may also selectively activate the lighting unit 360 on the imaging connection device 200 in order to illuminate the hitching environment. In one embodiment, the lighting unit 360 may be activated whenever the rear view camera 154 and/or the camera unit 350 are active, and in another embodiment, the lighting unit 360 may be activated based on predetermined parameters, such as available ambient light.

Figure 8:
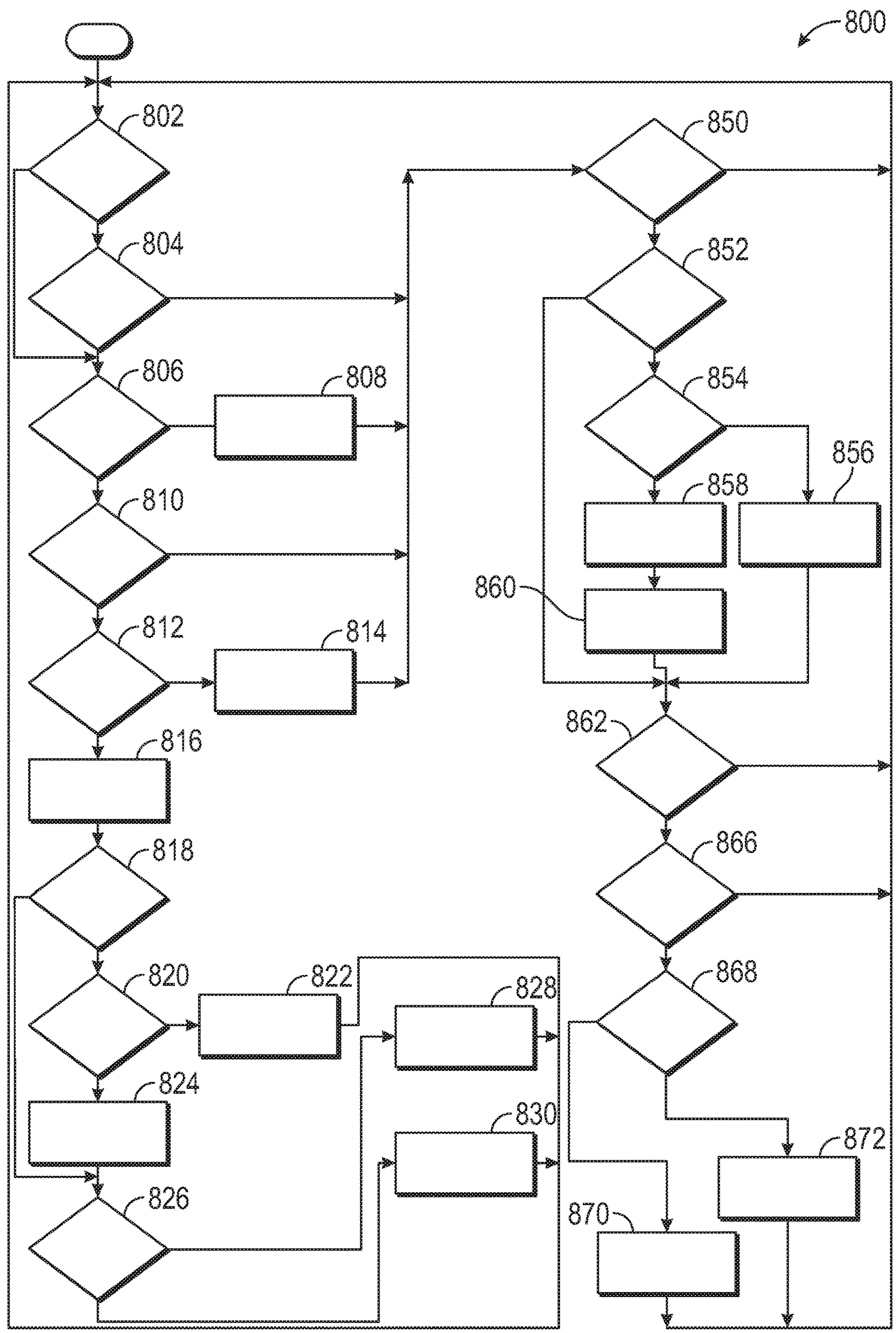
FIG. 8 is a flow chart of a method for hitching a trailer to a vehicle to form a towing arrangement in accordance with an exemplary embodiment.

Operation of the hitching system 102 is discussed in greater detail with reference to FIG. 8, which is a flowchart of a method 800 for viewing and/or illuminating the hitching environment according to an exemplary embodiment. In one embodiment, the method 800 may be implemented by the vehicle control system 140, particularly the hitching module 146 of the vehicle control system 140, although other arrangements may be provided. Accordingly, the method 800 is described below with reference to FIGS. 1-7.

In a first step 802, the vehicle control system 140 determines if the vehicle 110 is in the hitching mode. The vehicle control system 140 may make this determination based on operator selection (e.g., from an input device 164) and/or other parameters that indicate that the driver is preparing to begin a hitching operation. As examples, the vehicle control system 140 may determine that the vehicle 110 is in the hitching mode based on one or more of the following parameters: the transmission system 130 is in reverse; the device 200 has been inserted into the interface 114 and the wire harness 182 is not yet inserted; the sensor 150 and/or rear view camera 154 has detected the presence of the trailer 180 or tow assembly 182; or the like. Generally, any parameter or combination of parameters (or operator-initiated selection) may indicate that the vehicle 110 is in the hitching mode. For example, upon detection of one or more of these parameter conditions, the vehicle control system 140 may generate a message on the user interface 160 requesting confirmation of the hitching mode. If the vehicle 110 is in the hitching mode, the method 800 proceeds to step 806, discussed in greater detail below. If the vehicle 110 is not in the hitching mode, the method 800 proceeds to step 804.

In step 804, the vehicle control system 140 determines if the vehicle 110 is in a haul mode. Typically, the haul mode may be initiated by operator input, e.g., via user interface 160. In one embodiment, the haul mode may indicate to the vehicle control system 140 that a relatively heavy load is being added, and vehicle calibrations, such as shift points for the transmission system 130, may be invoked. If the vehicle 110 is not in the haul mode, the method 800 proceeds to step 850. If the vehicle 110 is in the haul mode, the method 800 proceeds to step 810. In some embodiments, the hitching mode and the haul mode may be combined, and/or one or both of the hitching mode and the haul mode may be omitted.

In step 806, the vehicle control system 140 determines if the imaging connection device 200 is installed on the vehicle 110. In particular, a sensor (e.g. one of sensors 150) in the vehicle interface 114 may collect data associated with the presence or absence of the device 200 within the interface 114.

If the imaging connection device 200 is not installed, the method 800 proceeds to step 808 in which the vehicle control system 140 generates a message, e.g., for display on the display device 162, that indicates the device 200 is not installed. Subsequently, the method 800 may proceed to step 850. If the device 200 is installed, the method 800 proceeds to step 810.

In step 810, the vehicle control system 140 determines if the vehicle 110 is in park, reverse, or a low gear. As one example, the vehicle control system 140 may make this determination based on information received from the transmission system 130 and/or a sensor (e.g., one of sensors 150) associated with the transmission system 130. If the vehicle 110 is not in park, reverse, or a low gear, the method 800 proceeds to step 850. If the vehicle 110 is in park, reverse, or a low gear, the method 800 proceeds to step 812.

In step 812, the vehicle control system 140 determines if the device 200 is properly paired for communication. As noted above, the device communications unit 340 may be configured for wireless communication with the vehicle communications unit 152 such that the vehicle control system 140 may send commands to the device 200 and the device 200 may send image data to the vehicle control system 140. The wireless communication between the units 152, 340 may be enabled with an exchange and acceptance protocol for short range wireless communications, as an example. If the device 200 is not properly paired with the vehicle communications unit 152, the method 800 may proceed to step 814 in which the vehicle control system 140 generates a message for the driver via the display device 162. Subsequently, the method 800 proceeds to step 850. If the device 200 is properly paired with the vehicle communications unit 152, the method 800 may proceed to step 816.

In step 816, the vehicle control system 140 activates or otherwise enables the camera unit 350 of the imaging connection device 200, for example, by sending an appropriate command via the communications unit 152. The vehicle control system 140 may also activate the rear view camera 154.

In subsequent steps, the lighting unit 360 may operate in cooperation with the camera unit 350 of the imaging connection device 200 in order to provide a more visible image of the hitching environment. In step 818, the vehicle control system 140 evaluates the level of ambient light in the hitching environment. In one embodiment, the vehicle control system 140 may evaluate the ambient light based on data collected by a light sensor, such as one of sensors 150 mounted on or within the vehicle 110 and/or a sensor mounted on the device 200. If the ambient light is greater than a predetermined threshold, the method 800 may proceed to step 826, discussed below. If the ambient light is less than a predetermined threshold, the method 800 may proceed to step 820.

In step 820, the vehicle control system 140 determines the status of the park lights of the lighting system 133 of the vehicle 110. The vehicle control system 140 may evaluate the status of the park lights based on signals from the lighting system 133. If the park lights are inactive, the method 800 proceeds to step 822 in which the vehicle control system 140 generates a message for the driver (e.g., via the display device 162) and further proceeds to step 850 such that the driver may activate the park lights during a subsequent iteration of the method 800. If the park lights are active, the method 800 proceeds to step 824.

In step 824, the lighting unit 360 of the imaging connection device 200 is activated to provide illumination to the hitching environment.

In step 826, the vehicle control system 140 evaluates the distance between the vehicle 110 and the trailer 180. In one embodiment, the vehicle control system 140 may make this evaluation based on data from a distance sensor (e.g., one of sensors 150). If the distance is greater than a predetermined distance threshold, the method 800 may proceed to step 828 in which the display device 162 renders an image based on data from the rear view camera 154, such as depicted in FIG. 6. If the distance is less than or equal to the predetermined distance threshold, the method 800 may proceed to step 830 in which the display device 162 renders an image based on data from the camera unit 350 of the imaging connection device 200. Accordingly, in steps 826, 828, and 830, the display device 162 displays the overhead view (e.g., image 600 of FIG. 6) at relatively large distances and the lateral view (e.g., image 700 of FIG. 7) at relatively small distances, thereby providing the most appropriate view for the distance. The display device 162 may continue displaying the respective image of steps 828, 830 for a predetermined amount of time and/or as long as the preceding conditions are satisfied, as indicated by a return to step 802.

In one embodiment, in step 826 when the distance is less than or equal to the threshold, the vehicle control system 140 may generate a message to the operator requesting confirmation or permission prior to proceeding to step 830. In other words, in this example, the first image of the overhead view is not automatically switched to the lateral view of the second image; but instead, such switching requires operator input.

In step 850 and subsequent steps, the method 800 addresses instances outside of the hitching operation in which the camera unit 350 and/or lighting unit 360 may be activated and utilized. In step 850, the vehicle control system 140 determines if the vehicle 110 is in a driving mode. Generally, the driving mode corresponds to a situation in which the vehicle is being operated and not in the hitching mode. If the vehicle 110 is not in the driving mode, the method 800 returns to the first step 802 for a further iteration. If the vehicle 110 is in the driving mode, the method 800 proceeds to step 852.

In step 852, the vehicle control system 140 determines if an image request has been received. An image request may be generated based on input from the driver, e.g., via the user interface 160. This may be appropriate when the driver desires to view an image from the camera unit 350 even when not in the hitching or haul modes. If an image request has not been received, the method 800 proceeds to step 862. If the image request has been received, the method 800 proceeds to step 854.

In step 854, the vehicle control system 140 determines if the imaging connection device 200 is installed and paired for communication, as discussed above with respect to steps 804 and 812. If the imaging connection device 200 is not properly installed and paired, the method 800 proceeds to step 856 in which the vehicle control system 140 generates a message, e.g., for display on the display device 162, that indicates the issue with the device 200. Subsequently, the method 800 may proceed to step 862. If the imaging connection device 200 is installed and paired, the method 800 proceeds to step 858.

In steps 858 and 860, the vehicle control system 140 commands activation of the camera unit 350, and upon receipt of the image data, generates display commands for rendering the image on the display device 162.

In step 862, the vehicle control system 140 determines if the vehicle 110 is in park or reverse, as discussed above in step 810. If the vehicle 110 is not in park or reverse, the method 800 returns to the first step 802 for a further iteration. If the vehicle 110 in park or reverse, the method 800 proceeds to step 866.

In step 866, the vehicle control system 140 evaluates the level of ambient light in the hitching environment, such as in step 818. If the ambient light is greater than a predetermined threshold, the method 800 returns to the first step 802 for a further iteration. If the ambient light is less than a predetermined threshold, the method 800 may proceed to step 868.

In step 868, the vehicle control system 140 determines if the status of the park lights, such as in step 820. If the park lights are inactive, the method 800 proceeds to step 870 in which the vehicle control system 140 generates a message for the driver (e.g., via the display device 162), and the method 800 returns to step 802 for a further iteration. If the park lights are active, the method 800 proceeds to step 872 in which the lighting unit 360 of the imaging connection device 200 is activated to provide illumination to the hitching environment. The lighting unit 360 may be active for a predetermined amount of time and/or as long as the preceding conditions are satisfied. The method 800 may return to step 802 for a further iteration.

Figure 9:
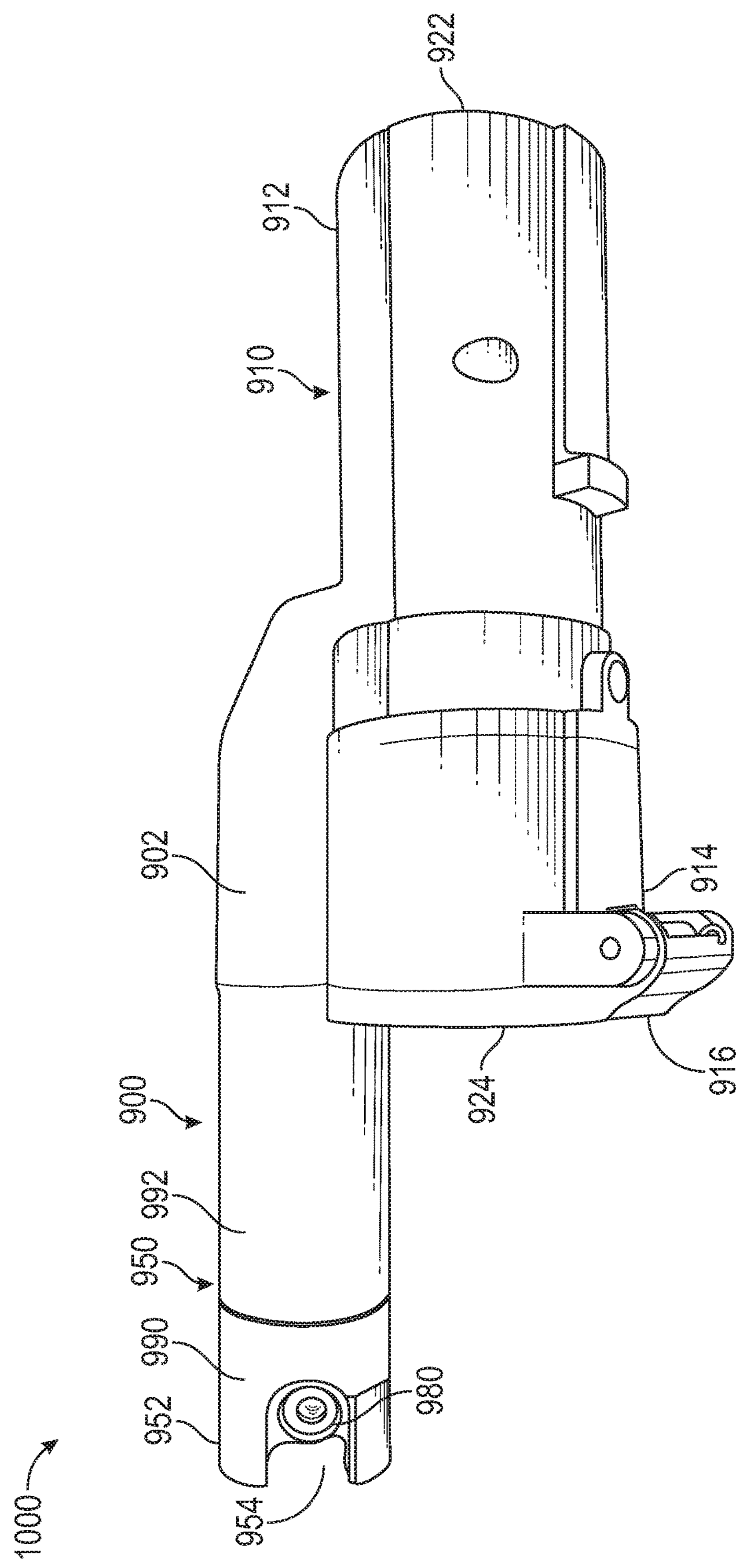
FIG. 9 is a side view of an integrated imaging connection device in accordance with a further exemplary embodiment.
Figure 10:
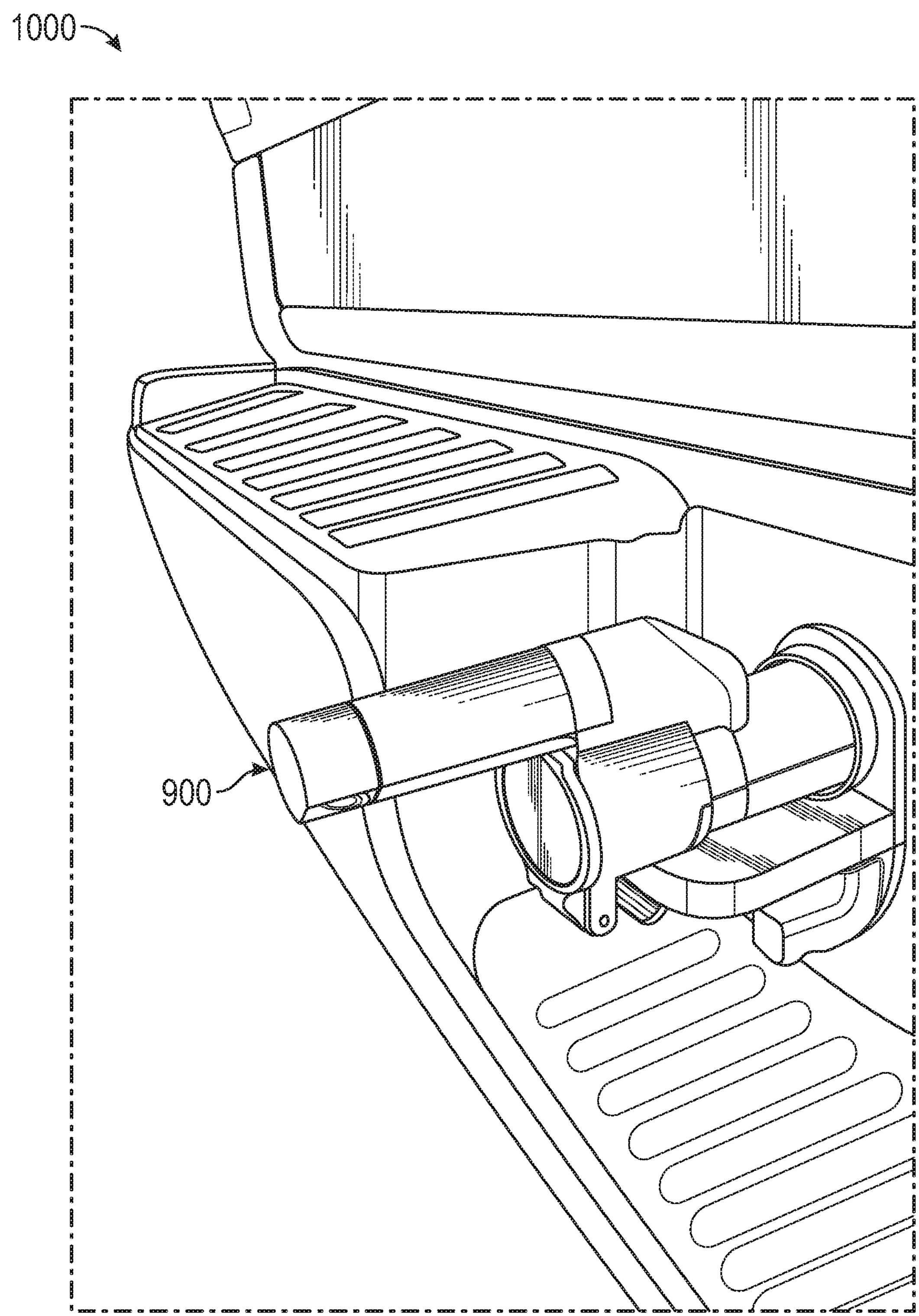
FIG. 10 is an isometric top view of the environment of a towing arrangement with the integrated imaging connection device of FIG. 9 prior to a hitching operation in accordance with an exemplary embodiment.
Figure 11:
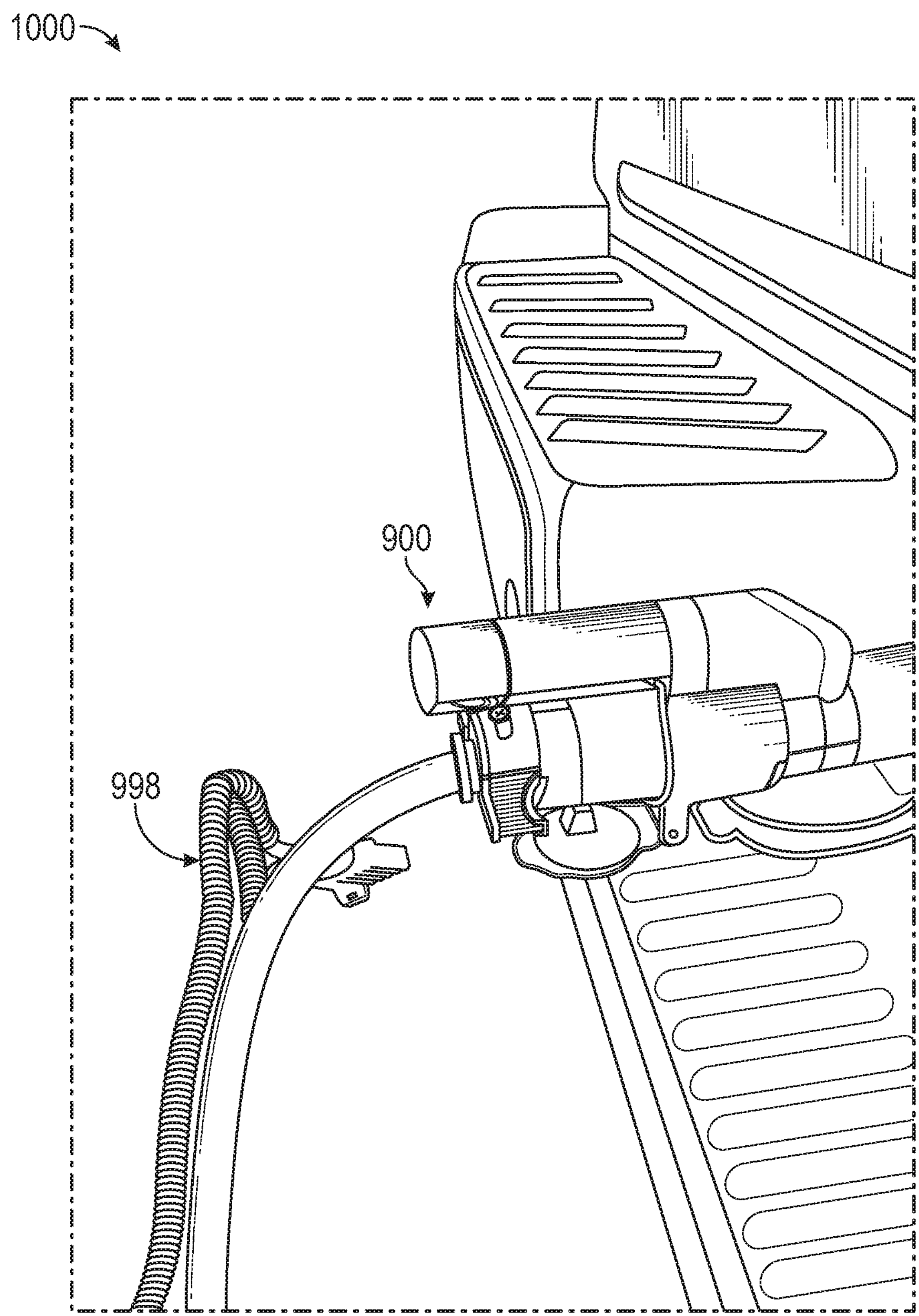
FIG. 11 is an isometric top view of the environment of the towing arrangement with the integrated imaging connection device of FIG. 9 after the hitching operation in accordance with an exemplary embodiment.

FIGS. 9-11 depict an integrated imaging connection device 900 that may be incorporated into a towing arrangement 1000 in accordance with another embodiment. Unless otherwise noted, the towing arrangement 1000 and imaging connection device 900 may respectively correspond to the towing arrangement 100 and imaging connection device 200 discussed above.

FIG. 9 is a side view of the integrated imaging connection device 900 isolated from the towing arrangement 1000. FIG. 10 is a side view of the environment of a towing arrangement 1000 prior to a hitching operation in accordance with an exemplary embodiment, and FIG. 11 is a side view of the environment of the towing arrangement 1000 after the hitching operation.

As shown in FIGS. 9-11, the imaging connection device 900 is configured with a housing 902 having a first portion 910 and a second portion 950. The first portion 910 has a generally cylindrical shape between a first end 912 and a second end 914. The first end 912 may be at least partially formed by the male-side connector 922, and the second end 914 may be at least partially by the female-side connector 924. In this embodiment, a cap 916 may be mounted on hinges to cover the connector 924 when not in use. The second portion 950 extends from the second end 914 of the first portion 910 with an orientation generally parallel to the first portion 910 such that the second portion 950 extends beyond the length of the first portion 910. The second portion 950 has a distal end 952 with an aperture 954 that enables the camera unit 980 housed within the second portion 950 to capture side view images of the hitch and tow assemblies (not shown). Although the imaging connection device 900 in FIGS. 9-11 does not include a lighting assembly, one may be provided. As best shown in FIG. 11, the end of the wire harness 998 from the trailer may be inserted in the female-side connector 924 upon removal of the cap 916 in order to form the wire connection between the vehicle and the trailer.

As also shown in FIGS. 9-11, the imaging connection device 900 may be implemented such that the housing 902 and/or camera unit 980 are adjustable to modify the orientation of view of the camera unit 980. This enables the imaging connection device 900 to be used across vehicle platforms with different vehicle interface and/or hitch assembly positions.

In one embodiment, the adjustable orientation of view for the imaging connection device 900 is provided by split housing parts 990, 992 formed in the second portion 950 of the housing 902. The first housing part 990 is retained by the second housing part 992 in the axial and radial directions relative to a longitudinal axis of the device 900, particularly of the housing parts 990, 992; however, the retention mechanisms are such that the first housing part 990 may rotate relative to the second housing part 992. Such retention mechanisms may include cooperating sleeves or bearings that allow rotation while flanges and/or detents maintain the axial position. The camera unit 980 is arranged within the first housing part 990 such that the camera unit 980 rotates with the first housing part 990. Any suitable connection features and/or electric couplings may be provided to facilitate rotation of the camera unit 980. In some embodiments, the first and/or second housing parts 990, 992 may be provided with indexing or articulation features or settings that enable predetermined or measured positions, e.g., such that the position of the first housing part 990 may be mapped to the vehicle model or vehicle interface location. Typically, the adjustment of the first housing part 990 and camera unit 980 may be performed manually, while in other embodiments, the device 900 may include an actuator that receives signals from the vehicle controller based on operator commands to automatically adjust the orientation of view.

Other adjustment or articulation mechanisms may be provided. For example, the device may include a hinged portion housing the camera unit that enables adjustments. In other examples, the camera unit may be mounted on an adjustable or flexible arm extending from the housing of the device. In further examples, the camera unit may be mounted on an outer rotating sleeve extending around the housing of the device. Such adjustment or articulation mechanisms may also be implemented on the device 200 discussed above.

Accordingly, exemplary embodiments described herein facilitate the hitching operation by providing a side view of the hitch and tow assemblies, which may be a considerable improvement for the final stages of the hitching operation as compared to images from rear view cameras. This provides a much easier and efficient hitching operation. The side view images are provided with an imaging connection device that interacts with the wired interfaces of the vehicle and trailer. The device may be implemented with existing interfaces and without further additional hardware, thereby providing a "plug and play" implementation. The device may be provided without requiring an additional power source or wiring arrangement.

The teachings herein are not limited to use only with automobiles but rather, may be used with other types of vehicles as well. For example, the teachings herein may be compatible with vehicles including, but not limited to, aircraft, railway cars, commercial vehicles including tractors, aircraft tugs, aircraft pushback tugs, forklifts, etc.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the vehicle system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

What is claimed is:

1. An imaging connection device for use with a vehicle and a trailer, the vehicle having a hitch assembly, the imaging connection device comprising: a housing defining a first connector and a second connector, the first connector configured to mate with the vehicle and the second connector configured to mate with the trailer; a connector interface at least partially arranged within the housing and extending between the first connector and the second connector; a camera unit at least partially arranged within the housing and configured to capture image data representing a side view of the hitch assembly; and a wireless communications unit at least partially arranged within the housing and configured to transmit the image data captured by the camera unit for display on a display device, wherein the housing further defines a first housing part and a second housing part, the first housing part being movable relative to the second housing part, and wherein at least a portion of the camera unit is positioned within the first housing part such that movement of the first housing part modifies an orientation of view of the camera unit.

2. The imaging connection device of claim 1, wherein the camera unit and wireless communications unit are configured to receive power via the connector interface from a wired vehicle interface.

3. The imaging connection device of claim 1, further comprising a lighting unit coupled to the housing and configured to illuminate the side view of the hitch assembly.

4. The imaging connection device of claim 1, further comprising a device controller housed within the housing, coupled to the connector interface, the camera unit, and the wireless communications unit, and configured to operate the camera unit based on command signals received via the wireless communications unit.

5. The imaging connection device of claim 1, wherein the first connector and the second connector are seven-pin connectors.

6. A hitching system for hitching a vehicle to a trailer, comprising: a hitch assembly mounted to the vehicle; a tow assembly mounted to the trailer and configured to be mechanically secured to the hitch assembly during a hitching operation; a wired interface arranged on the vehicle and coupled to a power source in the vehicle; a wire harness with a first end extending from the trailer; and an imaging connection device comprising: a housing defining a first connector and a second connector, the first connector configured to mate with the wired vehicle interface and the second connector configured to mate with the first end of the wire harness; a connector interface at least partially arranged within the housing and extending between the first connector and the second connector such that the wired vehicle interface is electrically coupled to the wire harness; a camera unit at least partially arranged within the housing and configured to capture side view image data representing a side view of the hitch assembly; and a first communications unit at least partially arranged within the housing and configured to transmit the side view image data captured by the camera unit for display on a display device, wherein the housing further defines a first housing part and a second housing part, the first housing part being movable relative to the second housing part, and wherein at least a portion of the camera unit is positioned within the first housing part such that movement of the first housing part modifies an orientation of view of the camera unit.

7. The hitching system of claim 6, wherein the camera unit and the first communications unit are configured to receive power from the power source via the connector interface and the wired vehicle interface.

8. The hitching system of claim 6, wherein the first connector and the second connector are seven-pin connectors.

9. The hitching system of claim 6, further comprising a second communications unit that is a vehicle communications unit configured to wirelessly communicate with the first communications unit, and wherein the hitching system further comprises a vehicle control system configured to provide command signals for the imaging connection device via the vehicle communications unit and the first communications unit.

10. The hitching system of claim 9, further comprising a rear view camera mounted on a rear portion of the vehicle and configured to capture top view image data representing a top view of the hitch assembly and to provide the top view image data to the vehicle control system, and wherein the vehicle control system is configured to generate display commands representing at least one of the top view image data or the side view image data on the display device.

11. The hitching system of claim 10, further comprising a distance sensor configured to determine a distance between the vehicle and the trailer and provide the distance to the vehicle control system, and wherein the vehicle control system is configured to evaluate the distance and generate the display commands with the top view image data when the distance is greater than a threshold and with the side view image data when the distance is less than or equal to the threshold.

12. The hitching system of claim 10, further comprising a user interface coupled to the vehicle control system and comprising an input device configured to receive a user input from an operator, wherein the vehicle control system selects the top view image data or the side view image data for display on the display device based on the user input.

13. The hitching system of claim 9, further comprising a lighting unit coupled to the housing and configured to illuminate the side view of the hitch assembly.

14. The hitching system of claim 13, wherein the vehicle control system is configured to provide the command signals to activate the lighting unit when the camera unit is active.

15. The hitching system of claim 13, further comprising an ambient light sensor configured to measure data representing an amount of ambient light and provide the data representing the amount of ambient light to the vehicle control system, wherein the vehicle control system is configured to provide the command signals to activate the lighting unit when the ambient light is less than a predetermined threshold.

16. The hitching system of claim 6, wherein the display device is a vehicle display device incorporated into an interior of the vehicle.

17. A method for hitching a vehicle having a hitch assembly and a trailer having a tow assembly in a towing arrangement; comprising: powering a camera unit and a communications unit within the imaging connection device with power via a wired interface; modifying a first orientation of view of the camera unit with a housing having a first housing part and a second housing part, the first housing part being movable relative to the second housing part, and wherein at least a portion of the camera unit is positioned within the first housing part such that movement of the first housing part modifies the orientation of view of the camera unit; capturing a side view image with the camera unit of a hitching environment, including the hitch assembly of the vehicle; wirelessly transmitting the side view image with the communications unit; and displaying the side view image to an operator on a display device.

18. The method of claim 17, further comprising selectively activating a lighting unit on the imaging connection device to illuminate the hitching environment.

19. The method of claim 17, further comprising capturing a top view image with a rear view camera mounted on the vehicle and selectively displaying the top view image.

* * * * *